United States Patent [19]
Adams

[11] Patent Number: 5,265,789
[45] Date of Patent: Nov. 30, 1993

[54] PIPE WELDING COUNTERWEIGHT SUPPORT APPARATUS

[76] Inventor: Mark F. Adams, 20 Maligne Dr., Devon, Alberta, Canada, TOC-IEO

[21] Appl. No.: 18,216

[22] Filed: Feb. 16, 1993

[51] Int. Cl.$^5$ .................. B23K 37/04; B23K 37/053
[52] U.S. Cl. .................. 228/49.3; 228/212; 269/130
[58] Field of Search .......... 228/44.5, 47, 48, 49.3, 228/212; 269/43, 130, 131; 29/281.6

[56] References Cited

U.S. PATENT DOCUMENTS

| | | | |
|---|---|---|---|
| 3,870,288 | 3/1975 | McLarnon | 228/49.3 |
| 3,963,231 | 6/1976 | Cooper | 269/130 |
| 4,042,231 | 8/1977 | Kopczynski et al. | 269/48.1 |
| 4,524,959 | 6/1985 | Kubo | 269/43 |
| 5,040,716 | 8/1991 | Stetz | 228/49.3 |

Primary Examiner—Samuel M. Heinrich
Attorney, Agent, or Firm—Leon Gilden

[57] ABSTRACT

An assembly arranged for mounting to a pipe to be welded is provided, wherein the assembly includes a support pipe having a counterweight slidably mounted therealong. The support pipe includes a V-shaped lock receiving the pipe to be welded, with a clamp chain arranged for securing the pipe to be welded relative to the V-shaped lock, whereupon sliding of the counterweight relative to the support pipe provides for counter-balancing of the pipe to be welded in an adjustable manner.

5 Claims, 4 Drawing Sheets

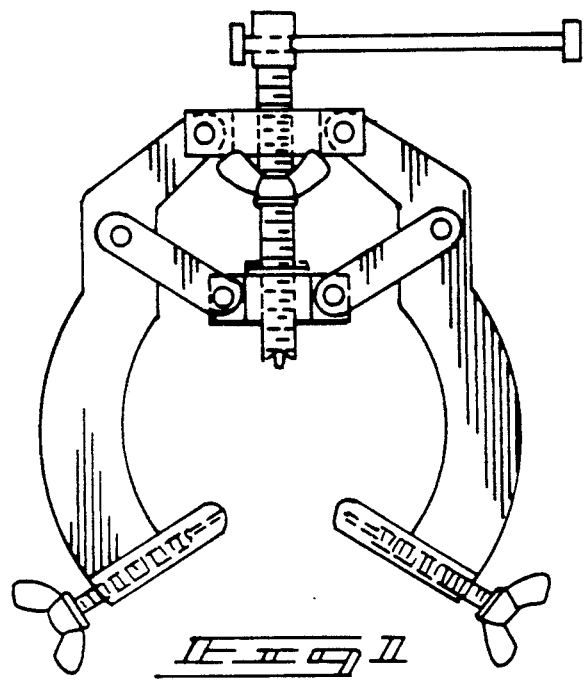
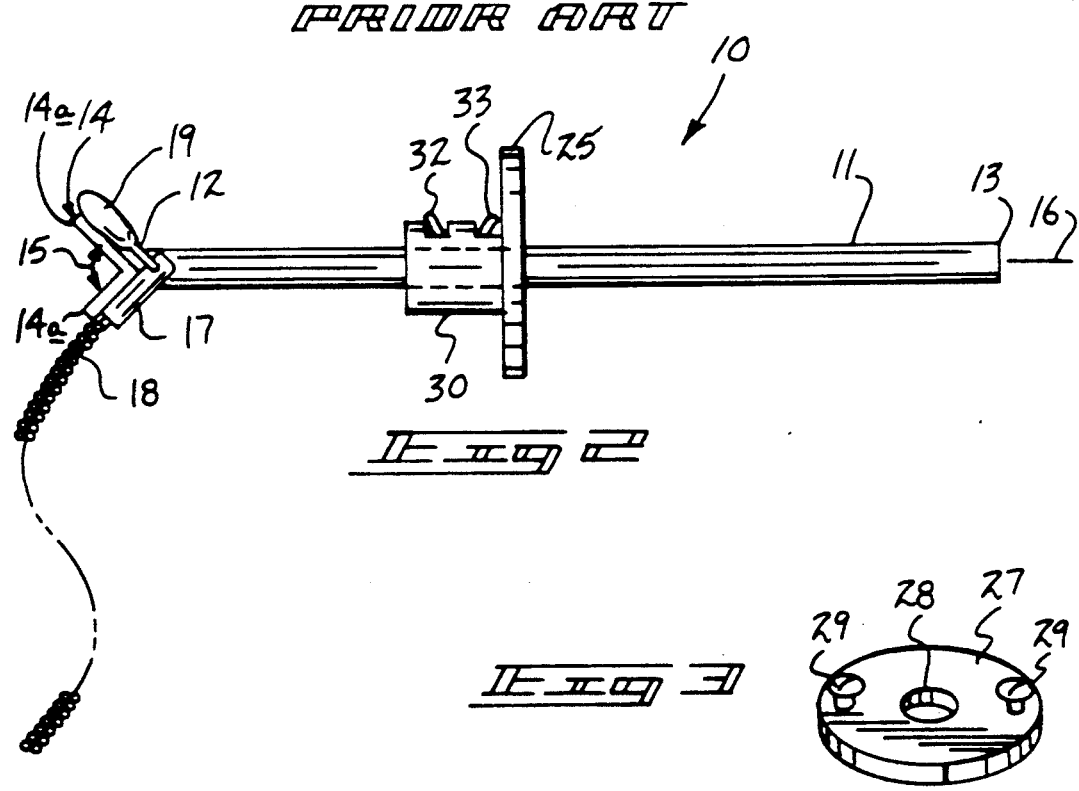

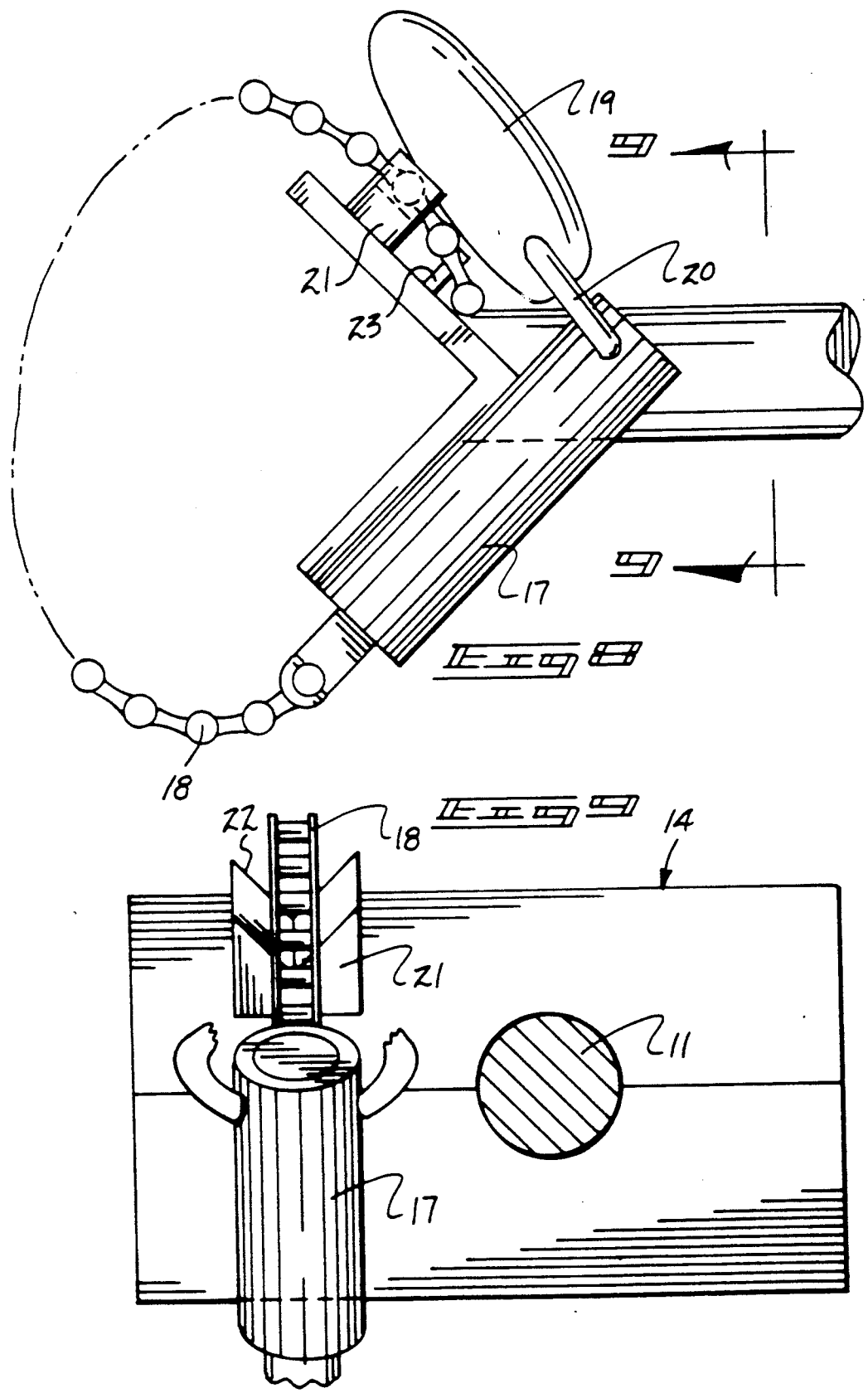

PIPE WELDING COUNTERWEIGHT SUPPORT APPARATUS

BACKGROUND OF THE INVENTION

1. Field of the Invention

The field of invention relates to pipe welding apparatus, and more particularly pertains to a new and improved pipe welding counterweight support apparatus wherein the same is arranged for the ease of manipulation and securement of a pipe to be welded.

2. Description of the Prior Art

Pipe welding fixtures of various types have been utilized throughout the prior art. In the welding of pipes having offset ends and the like, the pipe is frequently difficult to manipulate, wherein the instant invention attempts to address this concern by providing for a clamp structure, and wherein the clamp structure further includes a counterweight assembly to counter-balance the projecting portion of the pipe to provide for neutral mounting and positioning of the pipe during the welding procedure and in this respect, the present invention substantially fulfills this need.

Prior art structure relative to the securement of pipes in a welding environment are exemplified by the U.S. Pat. Nos. 4,524,959; 5,040,716; 3,963,231; and 3,870,288.

SUMMARY OF THE INVENTION

In view of the foregoing disadvantages inherent in the known types of pipe welding apparatus now present in the prior art, the present invention provides a pipe welding counterweight support apparatus wherein the same is arranged for the clamping and ease of manipulation, as well as the counter-balancing of a pipe to be welded. As such, the general purpose of the present invention, which will be described subsequently in greater detail, is to provide a new and improved pipe welding counterweight support apparatus which has all the advantages of the prior art pipe welding apparatus and none of the disadvantages.

To attain this, the present invention provides an assembly arranged for mounting to a pipe to be welded, wherein the assembly includes a support pipe having a counterweight slidably mounted therealong. The support pipe includes a V-shaped lock receiving the pipe to be welded, with a clamp chain arranged for securing the pipe to be welded relative to the V-shaped lock, whereupon sliding of the counterweight relative to the support pipe provides for counter-balancing of the pipe to be welded in an adjustable manner.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe welding counterweight support apparatus which has all the advantages of the prior art pipe welding apparatus and none of the disadvantages.

It is another object of the present invention to provide a new and improved pipe welding counterweight support apparatus which may be easily and efficiently manufactured and marketed.

It is a further object of the present invention to provide a new and improved pipe welding counterweight support apparatus which is of a durable and reliable construction.

An even further object of the present invention is to provide a new and improved pipe welding counterweight support apparatus which is susceptible of a low cost of manufacture with regard to both materials and labor, and which accordingly is then susceptible of low prices of sale to the consuming public, thereby making such pipe welding counterweight support apparatus economically available to the buying public.

Still yet another object of the present invention is to provide a new and improved pipe welding counterweight support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a prior art pipe clamping structure relative to a welding environment.

FIG. 2 is an orthographic view of the invention.

FIG. 3 is an isometric illustration of an additional counterweight plate member arranged for securement to the apparatus as set forth in FIG. 2.

FIG. 8 is an enlarged orthographic view of the V-shaped support block of the invention.

FIG. 9 is an orthographic view, taken along the lines 9—9 of FIG. 8 in the direction indicated by the arrows.

DESCRIPTION OF THE PREFERRED EMBODIMENT

Figure 4:
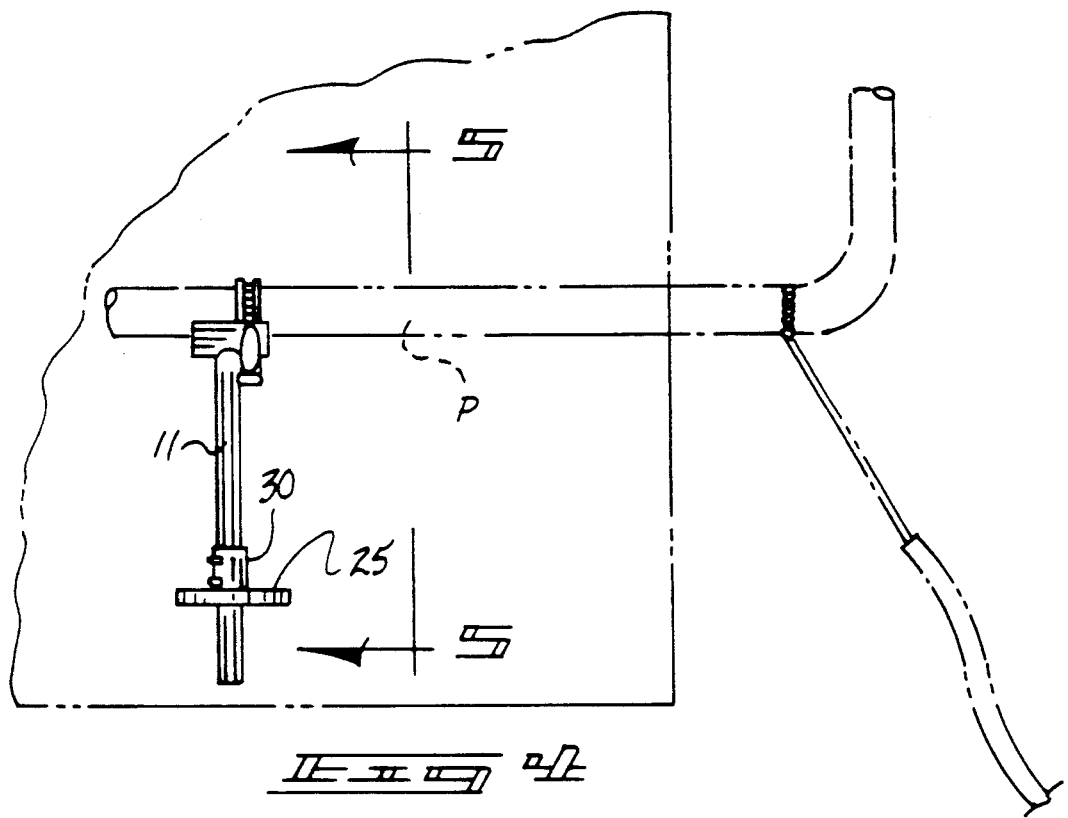
FIG. 4 is an orthographic top view of the organization in use mounted relative to a table top.

With reference now to the drawings, and in particular to FIGS. 1 to 9 thereof, a new and improved pipe welding counterweight support apparatus embodying the principles and concepts of the present invention and generally designated by the reference numeral 10 will be described.

FIG. 1 indicates a prior art pipe joint support structure, as indicated in U.S. Pat. No. 4,524,959, including a triad of abutment members projecting concentrically relative to one another to secure a pipe member therebetween.

Figure 5:
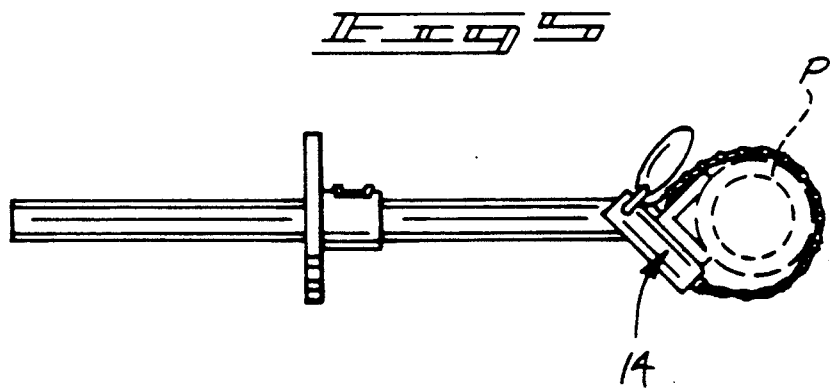
FIG. 5 is an orthographic view, taken along the lines 5—5 of FIG. 4 in the direction indicated by the arrows.
Figure 6:
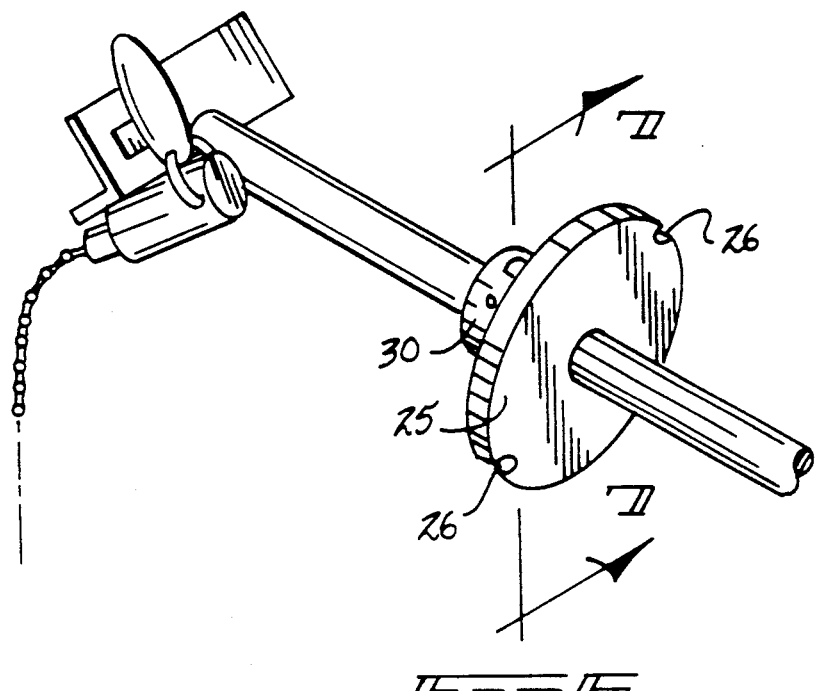
FIG. 6 is an isometric illustration of the invention.
Figure 7:
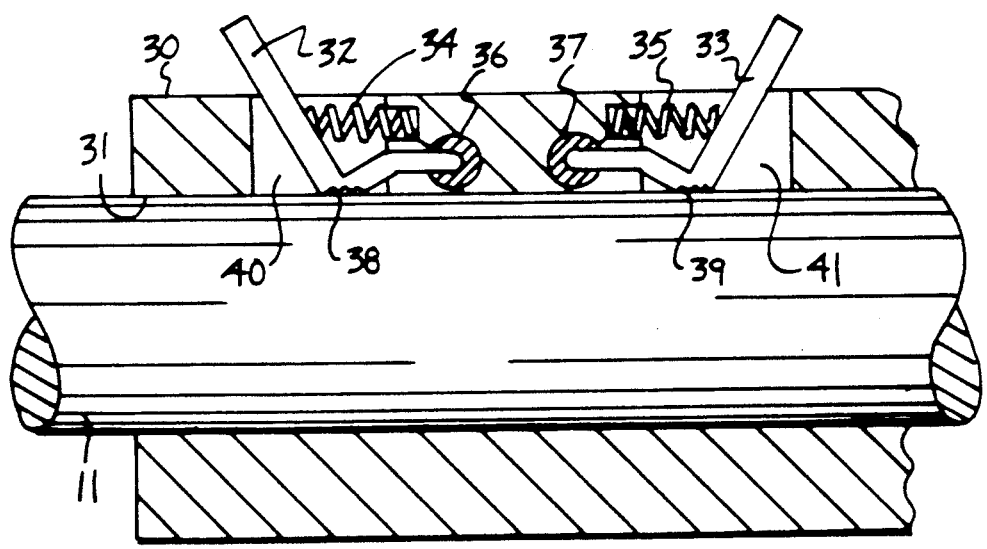
FIG. 7 is an orthographic view, taken along the lines 7—7 of FIG. 6 in the direction indicated by the arrows.

More specifically, the pipe welding counterweight support apparatus 10 of the instant invention essentially comprise an elongate support pipe 11, having a first end 12 spaced from a second end 13. The first end 12 includes a V-shaped support mount 14 fixedly secured to the first end 12 at the apex of the intersection of the support mount support plates 14a. An included angle 15 directed between the support plates 14a is bisected by the axis 16 of the support pipe 11. A chain support housing 17 is fixedly secured to one of the support plates 14a, with the support housing 17 having a link chain 18 pivotally secured at a first end of the link chain to the support housing 17, with a second end of the link chain arranged for wrapping about a pipe member "P" to be welded, as indicated in FIGS. 4 and 5 for example. A latch handle 19 is pivotally mounted to the support housing 17 about a pivot link 20. A V-shaped block 21 mounted to the other of the support plates 14a is aligned with a V-shaped notch 22 that further support plate 14a aligned with the V-shaped block 21. A receiving lug 23 oriented between the V-shaped block 21 and the apex of the support mount 14 projects through one of the links of the chain 18 as the V-shaped block 21 and the V-shaped notch 22 position the chain in a relative non-sliding relationship. The latch handle 19 arranges for ease of manipulation of the V-shaped support mount 14 relative to the support plate "P" prior to its securement thereto. As illustrated in FIG. 4, in this manner, the support pipe 11 functions as a handle for ease of manipulation of the pipe "P" to be welded. The pipe "P" as illustrated includes an offset portion, wherein to effect and prevent rotation of the pipe during welding and permit ease of rotation of the pipe during the welding procedure, a counter-balance plate 25 is slidably mounted to the support pipe 11 between the first end 12 and the second end 13, with the counter-balance plate 25 having notches 26 directed through the periphery of the counter-balance plate 25 diametrically opposed relative to one another to permit securement of a counter-balance second plate 27 onto the counter-balance plate 25. The second plate 27 includes a second plate bore 28 to receive the support pipe 11 therethrough, with fasteners 29 threadedly received into the second plate 27, with one of the fasteners 29 directed through one of the notches 26 to thereby secure the second plate 27 to the counter-balance plate 25. A plate hub 30 is fixedly mounted to the counter-balance plate 25. The hub 30 includes a plate hub bore 31 to slidably receive the support pipe 11 therethrough, with first and second V-shaped latch legs 32 and 33 mounted within respective first and second hub bores 40 and 41 directed into the plate hub 30, with the first and second hub bores 40 and 41 positioned in adjacency relative to one another. The first and second hub bores 40 and 41 are directed through the plate hub 30 in communication with the support pipe 11 slidably directed through the bore 31. First and second springs 34 and 35 are interposed between the respective first and second latch legs 32 and 33 and maintain first and second latch leg engaging surfaces 38 and 39 mounted at the respective first and second apex of the respective first and second latch legs into engagement with the support pipe 11. It should be noted that free ends of the first and second V-shaped latch legs 32 and 33 include first and second roller pivots 36 and 37 permitting ease of pivoting of the first and second latch legs relative to the first and second hub bores 40 and 41.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pipe welding counterweight support apparatus for securing a workpiece during a welding procedure, wherein the apparatus comprises,
    a support pipe, the support pipe having a first end spaced from a second end, with the support pipe symmetrically oriented about an axis, and
    a V-shaped support mount having first and second support plates joined together at an apex, and wherein the apex is fixedly secured to the first end, and wherein the first and second support plates define a predetermined angle therebetween, and the predetermined angle is bisected by the axis, and
    a latch chain secured to one of the support plates in a pivotal relationship, and wherein the latch chain is arranged for securement around the workpiece, and the latch chain further arranged for securement adjacent the second support plate to include latch means for securement of the chain relative to the second support plate.

2. An apparatus as set forth in claim 1 wherein the latch means includes a V-shaped block and a V-shaped notch mounted within the second support plate aligned with the V-shaped block, and a receiving lug fixedly mounted to the second support plate between the V-shaped block and the apex permitting projection of the receiving lug through the chain.

3. An apparatus as set forth in claim 2 including a latch handle, the latch handle having a latch handle pivot link, and the latch handle pivot link secured to the latch handle and to the support housing for ease of manipulation of the V-shaped support mount.

4. An apparatus as set forth in claim 3 including a counter-balance plate, the counter-balance plate including a counter-balance plate bore slidably receiving the support pipe therethrough, and a plate hub fixedly mounted to the counter-balance plate, the plate hub including a plate hub bore aligned with the counter-balance plate bore to receive the support pipe therethrough, the plate hub including spaced and adjacent first and second hub bores directed through the plate hub in communication with the plate hub bore, and the first hub bore and the second hub bore include respective first and second V-shaped latch legs, and first and second springs mounted within the respective first and second hub bores in communication with respective first and second latch legs, and the first and second latch legs include respective first and second latch leg engaging surfaces in contiguous engagement with the support pipe in a first position, and with the first and second latch legs engaging surfaces spaced from the support plate when the first and second latch legs are directed towards one another to compress respective first and second springs.

5. An apparatus as set forth in claim 4 including a counter-balance second plate, the counter-balance second plate including spaced second plate fasteners, and a second plate bore arranged for selective reception of the support lug therethrough, and the second plate fasteners are threadedly directed into the second plate, and the counter-balance plate includes diametrically aligned plate notches directed through a periphery of the counter-balance plate to receive the second plate fasteners through the notches in engaging the second plate to the counter-balance plate.

* * * * *